United States Patent [19]

I-Shou

[11] Patent Number: 5,182,697
[45] Date of Patent: Jan. 26, 1993

[54] COMPUTER WITH DETACHABLE PRINTER MOUNTING HARDWARE

[76] Inventor: Tasi I-Shou, 13F, No. 409, Sec. 2, Jenai Rd., Taipei, Taiwan

[21] Appl. No.: 820,231

[22] Filed: Jan. 14, 1992

[51] Int. Cl.⁵ .......................... H05K 7/10; G06F 1/00
[52] U.S. Cl. .................................... 361/393; 361/380; 400/691
[58] Field of Search .................. 364/708, 710.13; 400/691, 692; 361/380, 390, 391, 392, 394, 395, 399, 393

[56] References Cited

U.S. PATENT DOCUMENTS

| | | | |
|---|---|---|---|
| 4,680,674 | 7/1987 | Moore | 361/395 |
| 4,715,385 | 12/1987 | Cudahy et al. | 364/708 X |
| 4,883,376 | 11/1989 | Iwase et al. | 364/708 X |

FOREIGN PATENT DOCUMENTS 63-139774  6/1988  Japan ..................... 400/691

Primary Examiner—Gerald P. Tolin
Assistant Examiner—Michael W. Phillips
Attorney, Agent, or Firm—Bacon & Thomas

[57] ABSTRACT

A detachable printer mounting hardware comprises a computer mainframe, which has an elongated recess on a top edge thereof with a set of retaining holes and a printer-terminal connector at one end and two parallel rails at two opposite sides, and a printer housing detachably inserted into said elongated recess, which has two sliding grooves on two opposite sides for engaging said parallel rails respectively, a power switch on a top edge thereof, a set of hooks at one end releasably hooked in said retaining holes and a set of I/O pins connected to said printer-terminal connector.

1 Claim, 4 Drawing Sheets

COMPUTER WITH DETACHABLE PRINTER MOUNTING HARDWARE

BACKGROUND AND SUMMARY OF THE INVENTION

The present invention relates to a printer and relates more particularly to a detachable printer for a portable personal computer.

Several portable personal computers of laptop and notebook types have been known. However, either of the known structures of portable personal computers is equipped with a printer. When printing of data is required, a printer must be separately provided. It is therefore not convenient to carry a printer with a portable personal computer together.

The present invention has been accomplished to eliminate the aforesaid disadvantage. It is therefore the main object of the present invention to provide a detachable printer mounting hardware which has a channel on the mainframe thereof with a printer-terminal connector at one end for detachably carrying and connecting a printer for on-line operation.

BRIEF DESCRIPTION OF THE DRAWINGS

FIG. 1A is an enlarged partial sectional view of a retaining hole.

FIG. 1B is an enlarged view of a hook.

DETAILED DESCRIPTION OF THE PREFERRED EMBODIMENT

Figure 1:
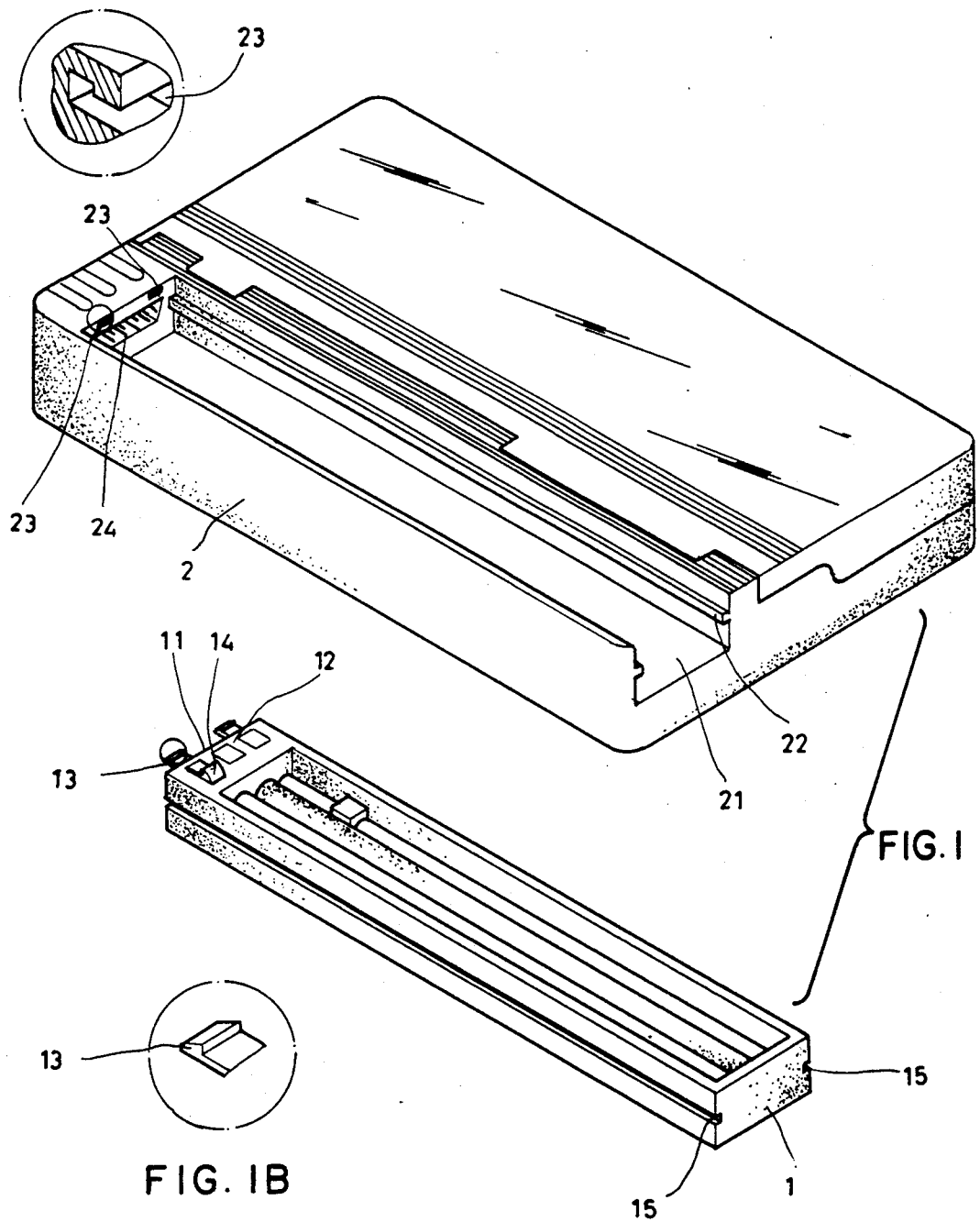
FIG. 1 is an exploded perspective view of the preferred embodiment of the present invention.
Figure 2:
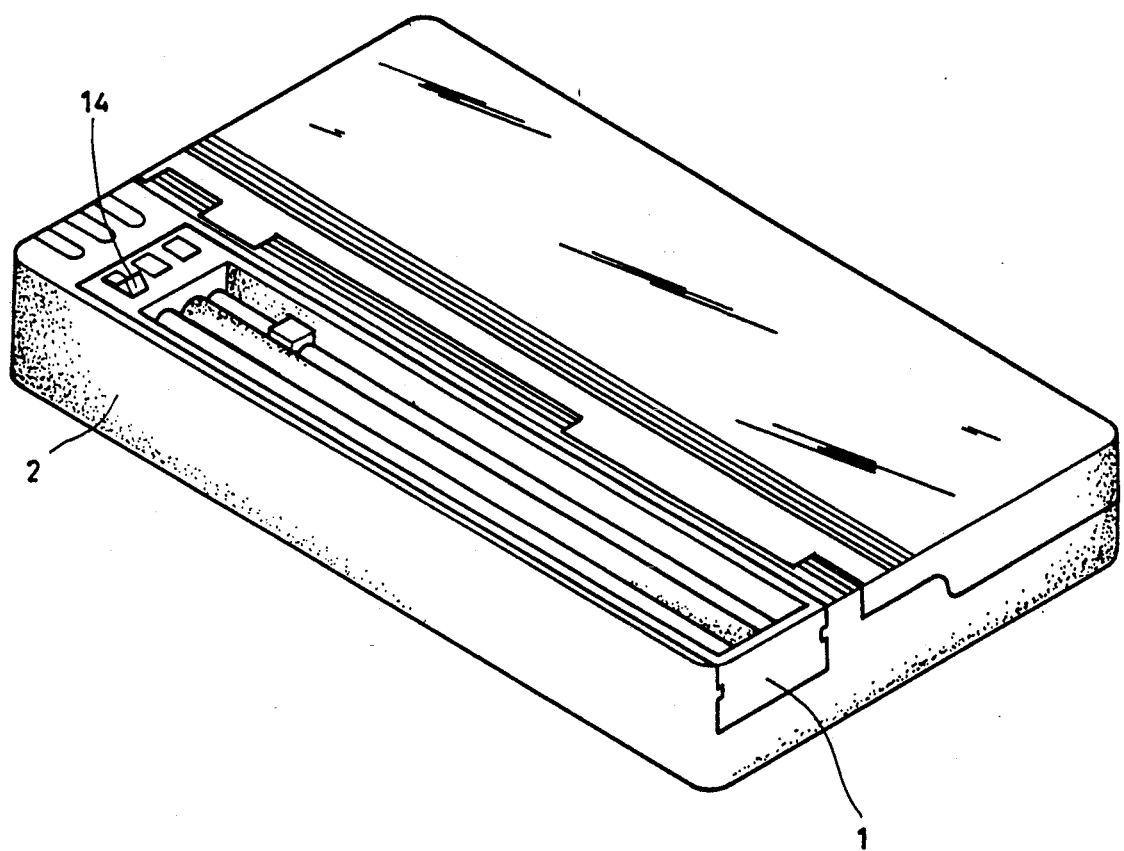
FIG. 2 is an elevational view of the preferred embodiment of the present invention.
Figure 3:
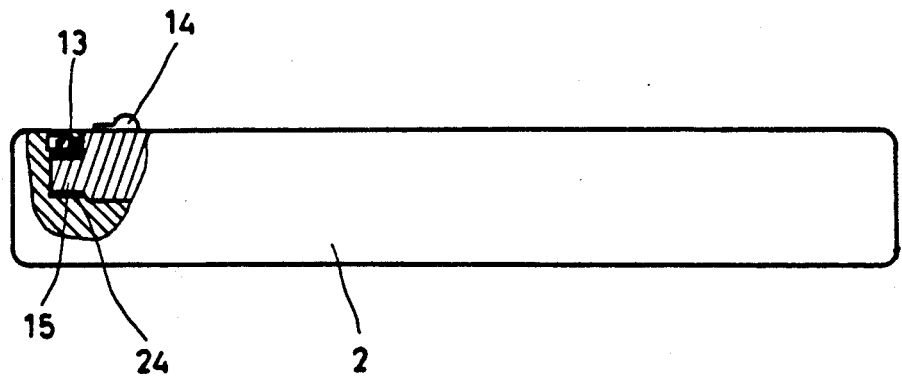
FIG. 3 is a side sectional view thereof showing that the printer housing is electrically connected to the printer-terminal connector of the mainframe.
Figure 4:
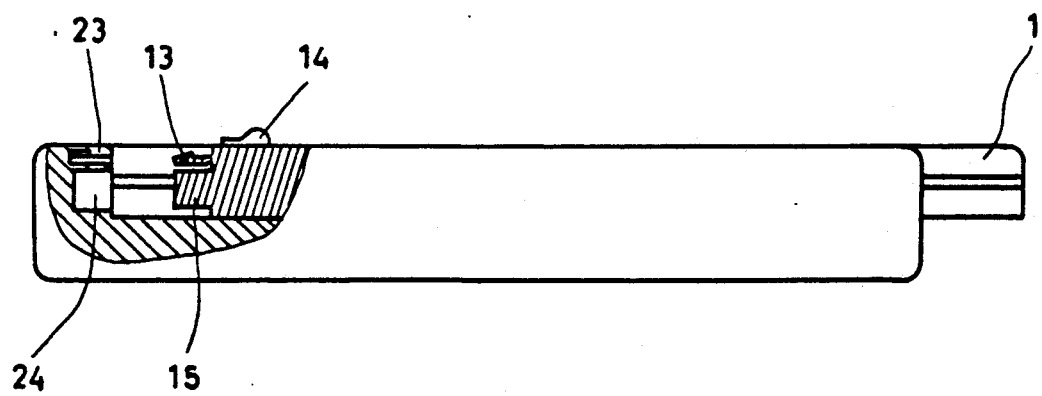
FIG. 4 is another side sectional view thereof showing that the printer housing is electrically disconnected from the printer-terminal connector of the mainframe.
Figure 5:
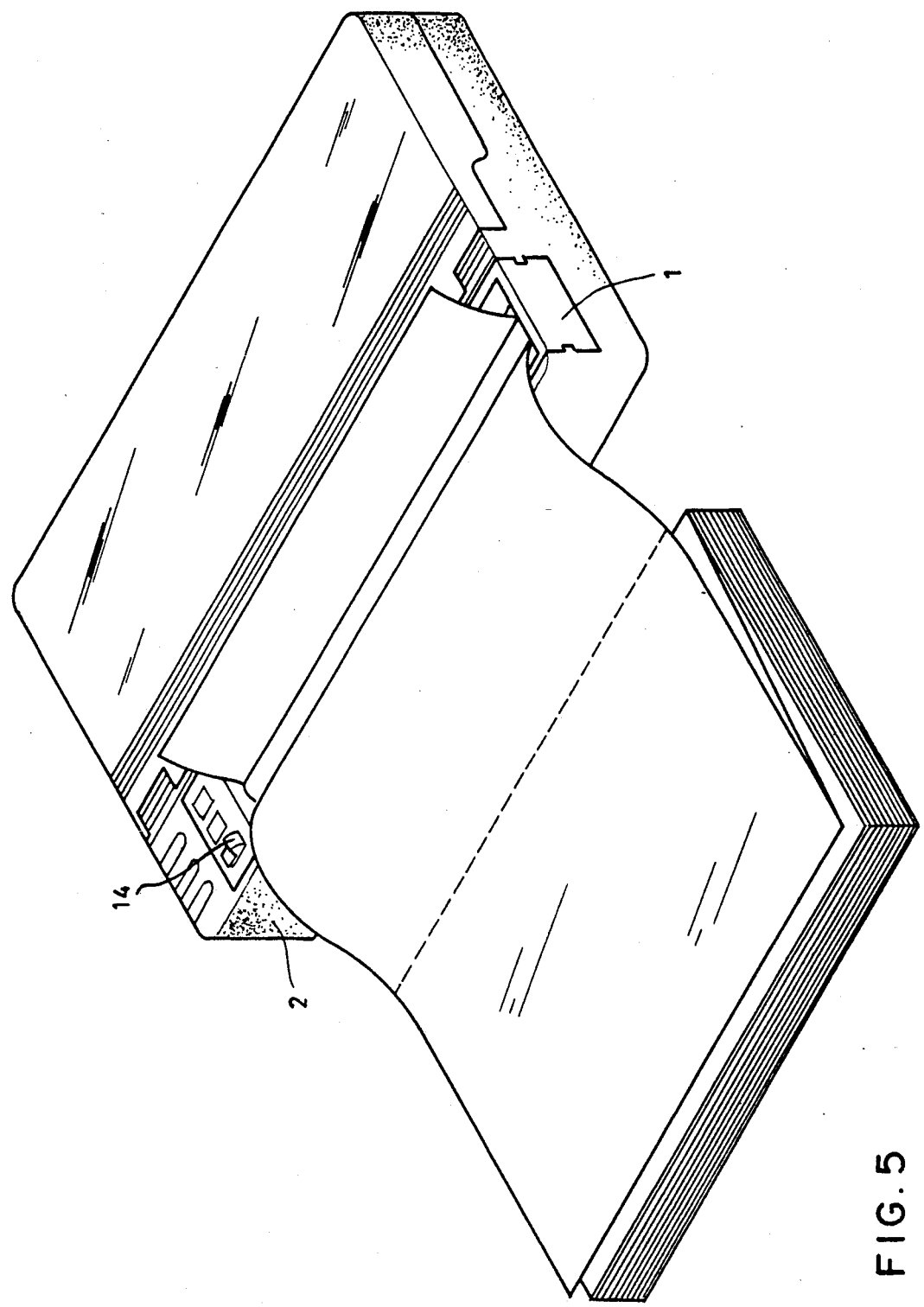
FIG. 5 is an elevational view of the preferred embodiment of the present invention showing its operation in printing data on a form-feed paper.

Referring to the annexed drawings in detail, a detachable printer mounting hardware as constructed in accordance with the present invention is generally comprised of a printer housing 1 and a computer mainframe 2. The printer housing 1 has I/O pins 11 and hooks 13 at one end 12, a power switch 14 at a suitable location and two sliding grooves 15 on two opposite sides thereof. The computer mainframe 2 has an elongated recess 21 longitudinaly disposed on a top edge thereof at one side, two parallel rails 22 bilaterally disposed inside the elongated recess 21, a plurality of retaining holes 23 and a printer-terminal connector 24 inside the elongated recess 21 at one end. The printer housing 1 can be conveniently inserted into the elongated recess 21 from one end (opposite to the printer-terminal connector 24) by engaging the two parallel rails 22 into the two sliding grooves 15. As soon as the printer housing 1 is completely inserted into the elongated recess 21, the hooks 13 are respectively hooked in the retaining holes 23 and, the I/O pins 11 are respectively inserted into the pin holes (not shown) on the printer-terminal connector 24. Thus, the printer housing 1 becomes incorporated into the computer mainframe 2. By squeezing the end 12 downwards and sliding the sliding grooves 15 on the rails 22, the printer housing 1 can be conveniently removed from the computer mainframe 2.

What is claimed is:

1. A detachable printer mounting hardware comprising:

a computer mainframe having an elongated recess longitudinally disposed on a top edge thereof at one side, said elongated recess including an opening at one end and a vertical stop wall at an opposite end, two parallel rails bilaterally disposed inside said elongated recess, a plurality of retaining holes and a printer-terminal connector on said vertical stop wall; and a printer housing detachably inserted through said opening into said elongated recess, said printer housing having a set of I/O pins connected to said printer-terminal connector, a set of hooks respectively hooked in said retaining holes, a power switch on a top edge thereof, and two sliding grooves on two opposite side walls thereof movably engaged with said two parallel rails.

* * * * *